Patented May 29, 1928.

1,671,765

UNITED STATES PATENT OFFICE.

GEORGE T. HARNED, OF NICHOLS, FLORIDA, ASSIGNOR TO THE PHOSPHATE MINING COMPANY, OF NEW YORK, N. Y., A CORPORATION OF NEW YORK.

METHOD OF TREATING PHOSPHATE ROCK.

No Drawing.   Application filed July 20, 1927.   Serial No. 207,321.

The present invention relates to a method of treating crude phosphate rock in a manner to increase the bone phosphate of lime content. It has been demonstrated that certain comparatively low-grade deposits of phosphate rock, such as occur in some Florida deposits, can be effectively employed for commercial purposes by calcining in a manner to expel water and organic substances and dissociate the calcium carbonate. The calcining of the crude rock in this fashion raises the relative proportion of bone phosphate of lime to a point where the price which can be obtained for a calcined product compares favorably with that obtained for higher grade phosphate rock; for example, rock having a bone phosphate of lime content averaging 74 per cent or better.

I have discovered that the calcining process may be measurably improved, both as to the quality of the finished product and the cost of producing, by mixing the crude calcined rock while still hot with wet uncalcined rock in proportions which may vary according to the desired content of carbon dioxide and bone phosphate of lime in the final product. By a proper combination of the calcined and uncalcined materials, the quality of the finished product is measurably improved, due to the inclusion of calcium carbonate and carbon dioxide in the mixture, and the otherwise wasted heat present in the hot rock is utilized for removing moisture and organic matter, if present, from the wet, uncalcined rock. The resulting product is well suited to the manufacture of acid phosphate.

According to the present invention, crude pebble phosphate is calcined in any suitable form of kiln to a temperature sufficiently high to drive off water and organic matter, dissociate the calcium carbonate into carbon dioxide and free lime, and cause a recombination of the lime in a permanent form, such as a phosphate. On completion of the calcining operation, the thus treated phosphate emerges from the kiln at a temperature approximating 2000° F., or above, and is thereafter mixed with a definite and pre-determined proportion of crude wet rock which may have a moisture content averaging 15 per cent. The proportion of wet rock may be determined by several factors; the bone phosphate of lime content initially present in the wet rock and in the calcined rock; the bone phosphate of lime and carbon dioxide content desired in the finished mixtures; and the amount of water present in the wet rock. As will be evident, the proportions of hot rock and wet rock must necessarily depend upon the desired characteristics of the finished material and the character of the crude rock. The combined materials pass through a rotary drum or cooler, and the heat from the hot, calcined product is sufficient to expel water and organic matter from the wet product mixed therewith. If desired, the wet product mixed with the calcined product may have initially a higher percentage of bone phosphate of lime to maintain the desired high average bone phosphate of lime content in the resulting mixture. This product, inasmuch as it contains the proper percentage of carbon dioxide, is better adapted for employment in the manufacture of fertilizer than a completely calcined product, due to the friable character of the product caused by the venting of the carbon dioxide from the acidulated rock.

In the best method now known of practising the invention, crude pebble phosphate having a comparatively low bone phosphate of lime content, perhaps 15 per cent of water, organic material, and calcium carbonate, is calcined in a rotary kiln at a sufficiently high temperature to expel the moisture and organic matter and dissociate the calcium carbonate, and promote a recombination of the free lime in the form of a fixed compound. The hot, calcined product discharged from the kiln at a temperature approximating 2000° F. is then mixed with a definite quantity of wet, uncalcined rock, the quantity of wet rock being varied with the character of the raw materials and with the properties desired in the finished product. It has been found under different conditions that the quantity of wet rock may vary from $\frac{1}{10}$ of a ton to 2½ tons of wet rock per ton of hot rock. By virtue of thus mixing the two materials, not only are useful and desirable economies promoted, but in addition there results an intimate mixture of calcined and uncalcined rock, the latter contributing the calcium carbonate which plays an important and essential role on acidulation to produce acid phosphate. The mixture of the two materials is completed by passage through an unheated rotary drum, which may be provided with successive flights designed to secure a through and adequate mixing of the materials. If so desired, the cooling and drying operation may be enhanced by continuous circulation of air through the drier in order to remove the steam generated by the mixture of calcined rock with the wet rock. The product emerging from the cooling drum represents a merchantable commodity having a low moisture content and of a composition well suited to the production of acid phosphate.

What is claimed is:

1. A process for treating crude phosphate rock which consists in calcining crude rock, directly mixing the hot, calcined rock with a predetermined proportion of wet rock, and utilizing the sensible heat of the calcined rock to dry and increase the bone phosphate of lime content of the wet rock.

2. A process for treating phosphate rock which consists in calcining the rock, mixing the hot, calcined rock with a predetermined proportion of wet rock, and retaining the two materials in intimate relation during the interchange of heat between the hot rock and wet rock in a manner to cool the hot rock and dry the wet rock to provide a relatively cool, dry mixture containing carbon dioxide suitable for commercial purposes.

3. A process for treating crude phosphate rock which comprises heating the crude rock to temperatures of 2000° F., or over, mixing the rock while still hot with wet rock, and maintaining the two materials in intimate relation to promote exchange of heat therebetween.

4. A process for treating crude phosphate rock which consists in mixing hot, calcined rock with wet rock having about 15 per cent moisture, and maintaining the two materials in intimate contact during the exchange of heat therebetween to cool the hot rock and utilize the heat therefrom to expel the moisture and increase the bone phosphate of lime content in the wet rock mixed therewith.

5. A process for treating phosphate rock which consists in calcining the rock to expel carbon dioxide, and thereafter mixing the hot, calcined rock with a predetermined proportion of wet, uncalcined rock containing calcium carbonate to utilize the sensible heat of the hot, calcined rock in expelling moisture and organic materials and secure a resulting mixture containing calcium carbonate.

6. A process for treating phosphate rock to elevate the relative proportion of bone phosphate of lime, which consists in calcining the rock at a temperature sufficiently high to expel water, carbon dioxide and organic matter, thereafter intimately mixing the hot rock with wet, uncalcined rock having a somewhat higher initial percentage of bone phosphate of lime to utilize the sensible heat in the calcined rock to expel moisture from the wet, uncalcined rock, producing a resulting mixture with a carbon dioxide content.

7. A process for treating phosphate rock which consists in intimately mixing hot, calcined rock with wet, uncalcined rock in definite proportions to produce a mixture having an increased percentage of bone phosphate of lime as compared with the crude rock, and containing calcium carbonate and carbon dioxide.

GEO. T. HARNED.